US012614682B2

(12) United States Patent
Xie

(10) Patent No.: US 12,614,682 B2
(45) Date of Patent: Apr. 28, 2026

(54) WALL-MOUNTED CENTRAL CONTROL SCREEN

(71) Applicant: HANGZHOU TUYA INFORMATION TECHNOLOGY CO., LTD., Zhejiang (CN)

(72) Inventor: Xinghua Xie, Hangzhou (CN)

(73) Assignee: HANGZHOU TUYA INFORMATION TECHNOLOGY CO., LTD, Hangzhou (CN)

( * ) Notice: Subject to any disclaimer, the term of this patent is extended or adjusted under 35 U.S.C. 154(b) by 0 days.

(21) Appl. No.: 18/994,744

(22) PCT Filed: Apr. 28, 2023

(86) PCT No.: PCT/CN2023/091505
§ 371 (c)(1),
(2) Date: Jan. 15, 2025

(87) PCT Pub. No.: WO2024/021725
PCT Pub. Date: Feb. 1, 2024

(65) Prior Publication Data
US 2026/0024710 A1      Jan. 22, 2026

(30) Foreign Application Priority Data

Jul. 29, 2022    (CN) .......................... 202222014051.2

(51) Int. Cl.
*H01H 9/18*        (2006.01)
*B60Q 3/64*        (2017.01)
(Continued)

(52) U.S. Cl.
CPC ........... *H01H 9/181* (2013.01); *G02B 6/0021* (2013.01); *G02B 6/0043* (2013.01); (Continued)

(58) Field of Classification Search
None
See application file for complete search history.

(56) References Cited

U.S. PATENT DOCUMENTS

| 2014/0286051 A1* | 9/2014 | Okura | .................. | G02B 6/0031 |
| | | | | 362/609 |
| 2017/0153723 A1* | 6/2017 | Fujimoto | ............... | H01H 9/182 |
| (Continued) | | | | |

FOREIGN PATENT DOCUMENTS

| CN | 104681323 A | | 6/2015 |
| CN | 205177649 U | * | 4/2016 |
| (Continued) | | | |

OTHER PUBLICATIONS

English Machine Translation of ISA Written Opinion for related PCT (Year: 2023).*

(Continued)

*Primary Examiner* — Keith G. Delahoussaye
(74) *Attorney, Agent, or Firm* — Carter, DeLuca & Farrell LLP; George Likourezos

(57)        ABSTRACT

A backlight structure and a wall-mounted central control screen. The backlight structure is disposed on an edge of an electronic device, and includes: light-emitting lamp beads, a lamp plate, and a special-shaped light guide strip, wherein the special-shaped light guide strip is provided with a straight groove in an extending direction thereof, a surface of the special-shaped light guide strip provided with the straight groove is abutted against the lamp plate to subsequently form a light source space for accommodating the light-emitting lamp beads, the special-shaped light guide strip includes a light incident surface and a light emergent surface, the light incident surface is disposed inside the light source space, and light emitted by the light-emitting lamp beads is towards the light incident surface, and the light (Continued)

emergent surface is located on an edge surface of the electronic device.

9 Claims, 3 Drawing Sheets

(51) Int. Cl.
    *B60Q 3/78*       (2017.01)
    *F21V 8/00*       (2006.01)
    *H01H 9/02*       (2006.01)

(52) U.S. Cl.
    CPC ......... *G02B 6/0088* (2013.01); *G02B 6/0091* (2013.01); *H01H 9/02* (2013.01); *B60Q 3/64* (2017.02); *B60Q 3/78* (2017.02); *H01H 9/18* (2013.01)

(56) References Cited

U.S. PATENT DOCUMENTS

| | | | | |
|---|---|---|---|---|
| 2018/0079357 A1* | 3/2018 | Kikuchi | ............... | G02B 6/0091 |
| 2018/0082801 A1* | 3/2018 | Lin | ........................ | H01H 13/14 |

FOREIGN PATENT DOCUMENTS

| | | | | | |
|---|---|---|---|---|---|
| CN | 205234112 U | | 5/2016 | | |
| CN | 209045085 U | * | 6/2019 | | |
| CN | 214580714 U | * | 11/2021 | ............... | B60Q 3/78 |
| CN | 217982704 U | | 12/2022 | | |
| JP | 2009128244 A | | 6/2009 | | |

OTHER PUBLICATIONS

International Search Report issued on Jul. 12, 2023, in corresponding International Application No. PCT /CN2023/091505, 7 pages.

* cited by examiner

WALL-MOUNTED CENTRAL CONTROL SCREEN

TECHNICAL FIELD

The present disclose relates to the field of electronic screens, and in particular to a backlight structure and a wall-mounted central control screen.

BACKGROUND

A central control screen for smart home is mainly intended to achieve signal interconnection between various electronic devices in a residence to facilitate people's lives.

In general, existing central control screens are largely mounted on a wall to subsequently serve as control terminals only, without any decorative effect, which often leads to dullness and lack of atmosphere.

SUMMARY

A main object of the present disclosure is to provide a backlight structure and a wall-mounted central control screen to at least solve the above technical problems existing in the prior art.

In order to achieve the above object, in a first aspect of the present disclosure, there is provided a backlight structure disposed on an edge of an electronic device. The backlight structure includes: light-emitting lamp beads, a lamp plate, and a special-shaped light guide strip, wherein the special-shaped light guide strip is provided with a straight groove in an extending direction thereof, a surface of the special-shaped light guide strip provided with the straight groove is abutted against the lamp plate to subsequently form a light source space for accommodating the light-emitting lamp beads, the special-shaped light guide strip comprises a light incident surface and a light emergent surface, the light incident surface is disposed inside the light source space, and light emitted from the light-emitting lamp beads is towards the light incident surface; and the light emergent surface is located on a surface of the edge of the electronic device.

In an optional implementation, a plurality of the light-emitting lamp beads is disposed evenly inside the light source space.

In an optional implementation, the light emergent surface is provided as a frosted matte surface.

In an optional implementation, the special-shaped light guide strip is a rigid light guide strip.

In a second aspect of the present disclosure, there is provided a wall-mounted central control screen including the backlight structure described in the first aspect of the present disclosure. The wall-mounted central control screen further comprises a side border and a back cover, and the side border together with the lamp plate and the special-shaped light guide strip defines the light source space.

In an optional implementation, the special-shaped light guide strip includes a platy fixing portion sandwiched between the back cover and the lamp plate.

In an optional implementation, a light emergent gap is disposed between the side border and the back cover. The special-shaped light guide strip comprises a light-emergent extending portion, the light emergent surface is disposed on an outer surface of the light-emergent extending portion, and after the platy fixing portion is sandwiched by the back cover and the light plate, the light-emergent extending portion passes through the light emergent gap.

In an optional implementation, the special-shaped light guide strip further includes a stepped connecting portion connected between the light-emergent extending portion and the platy fixing portion, the back cover is provided with a plate pressing rib and is tightly butted against the stepped connecting portion, and the plate pressing rib is tightly butted against the platy fixing portion.

In an optional implementation, the side border is connected onto a base plate connected to the back cover via a screw.

In an optional implementation, the screw also passes through the platy fixing portion and the lamp plate, and after the screw is tightened up, the platy fixing portion and the lamp plate are tightly butted against each other.

According to the backlight structure and the wall-mounted central control screen of the present disclosure, the backlight structure is disposed on a side surface of the wall-mounted central control screen; in the backlight structure, a plurality of light-emitting lamp beads is disposed on the lamp plate; and light emitted by the light-emitting lamp beads enters an interior of the special-shaped light guide strip via the light incident surface disposed on the special-shaped light guide strip, and is then refracted and scattered to the light emergent surface, thereby achieving a backlight effect for the wall-mounted central control screen to enhance the atmosphere.

It should be understood that the content described in this section is neither intended to identify key features or important features of the embodiments of the present disclosure, nor is it intended to limit the scope of the present disclosure. Other features of the present disclosure will be readily understood from the following specification.

BRIEF DESCRIPTION OF THE DRAWINGS

The above and other purposes, features and advantages of the exemplary embodiments of the present disclosure will become readily understood by reading the detailed description below with reference to the accompanying drawings. In the accompanying drawings, several embodiments of the present disclosure are illustrated in an exemplary rather than restrictive way, where.

in the drawings, the same or corresponding sign indicates the same or corresponding part.

DETAILED DESCRIPTION OF EMBODIMENTS

Figures 1, 2:
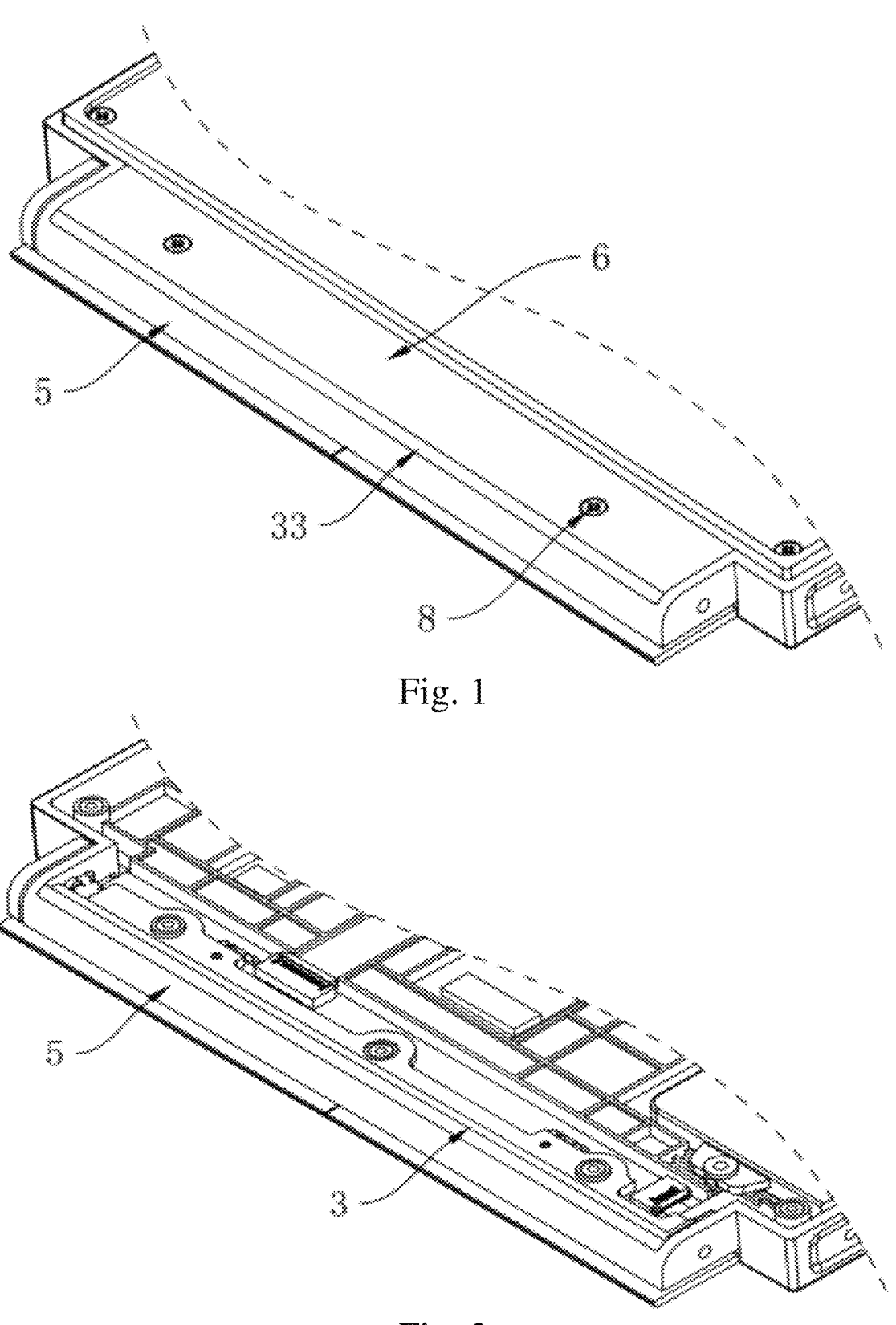
FIG. 1 is a schematic structural diagram of a backlight structure disposed on a side surface of a wall-mounted central control screen according to an embodiment of the present disclosure.
FIG. 2 is a schematic diagram of the structure in FIG. 1 with a back cover removed.

In order to make the object, features and advantages of the present disclosure clearer and understandable, the technical solutions in the embodiments of the present disclosure will be described clearly and completely below in conjunction with the accompanying drawings in the embodiments of the present invention. Obviously, the embodiments described are merely some instead of all of the embodiments of the present disclosure. All other embodiments obtained by a person skilled in the art based on the embodiments in the present disclosure without paying creative efforts shall fall within the scope of the present disclosure.

An embodiment provides a backlight structure, which may be disposed on an edge of an electronic device. When the electronic device is in use, colorful light may be emitted from the backlight structure to enhance the atmosphere. Here, the electronic device may be a display screen such as a desktop computer and a television, or a central control screen or an access control screen. In this embodiment, a wall-mounted central control screen for smart home is taken as an example.

In an embodiment of the present disclosure, the backlight structure is disposed on an edge of the wall-mounted central control screen. In case of a round wall-mounted central control screen, the backlight structure may be disposed around the circumferential outer side wall of the wall-mounted central control screen; and in case of a polygonal wall-mounted central control screen, the backlight structure may be disposed on the outer side wall(s) at one or more sides of the wall-mounted central control screen.

Referring to FIGS. 1-5, in an embodiment of the present disclosure, the wall-mounted central control screen has a side border 5 and a back cover 6, and the backlight structure is disposed on the inner side of the side border 5 and of the back cover 6. The backlight structure includes light-emitting lamp beads 1, a lamp plate 2 and a special-shaped light guide strip 3; the special-shaped light guide strip 3 is provided with a straight groove 31 in an extending direction thereof; after the surface of the special-shaped light guide strip 3 provided with the straight groove 31 is abutted against the lamp plate 2, the special-shaped light guide strip 3 together with the side border 5 and the lamp plate 2 defines a light source space 4, in which a plurality of light-emitting lamp beads 1 is arranged evenly; and the light-emitting lamp beads 1 are mounted on the lamp plate 2.

Figures 3, 4:
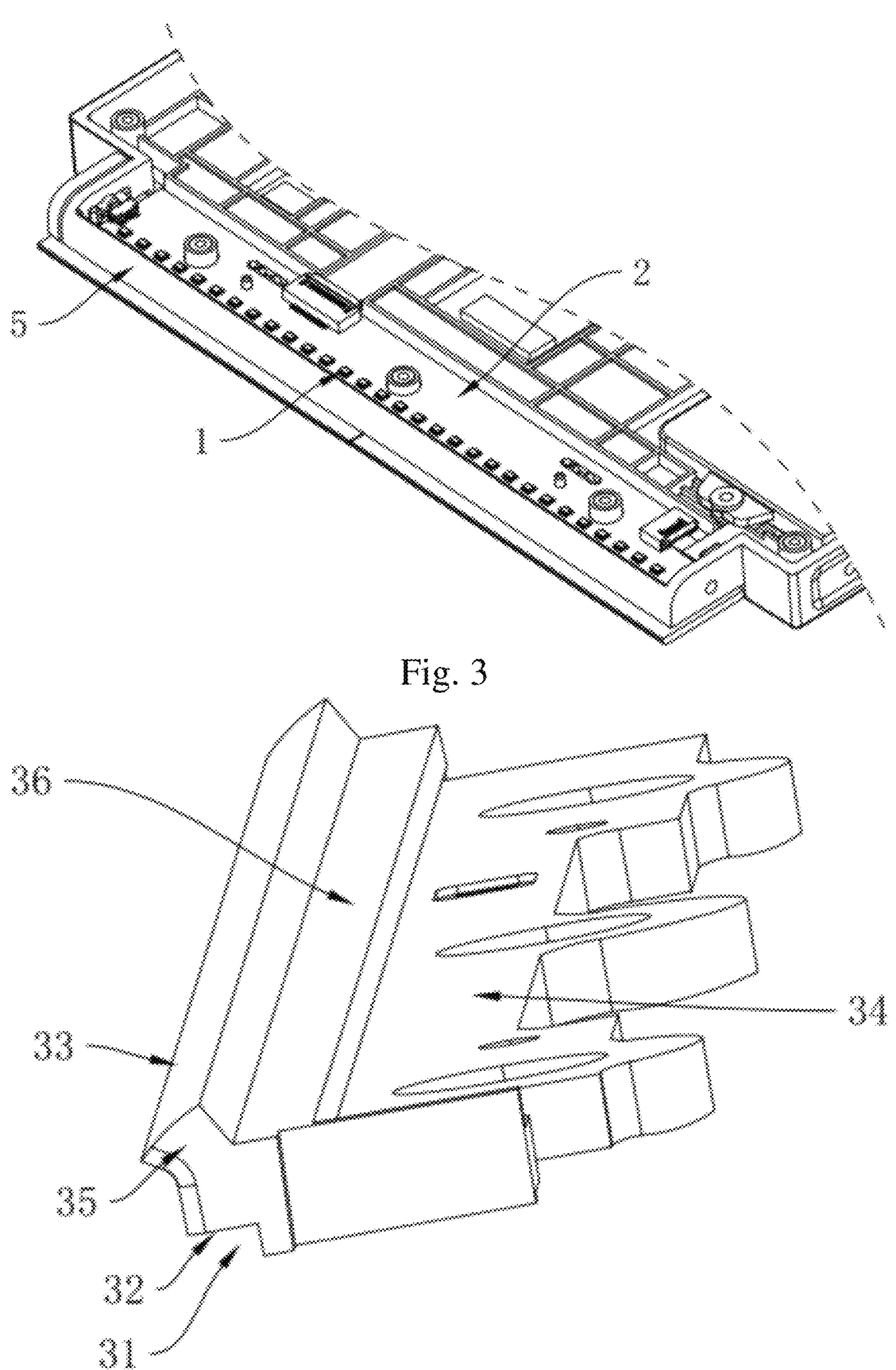
FIG. 3 is a schematic diagram of the structure in FIG. 2 with a special-shaped light guide strip removed.
FIG. 4 is a schematic structural diagram of a special-shaped light guide strip according to an embodiment of the present disclosure.
Figure 5:
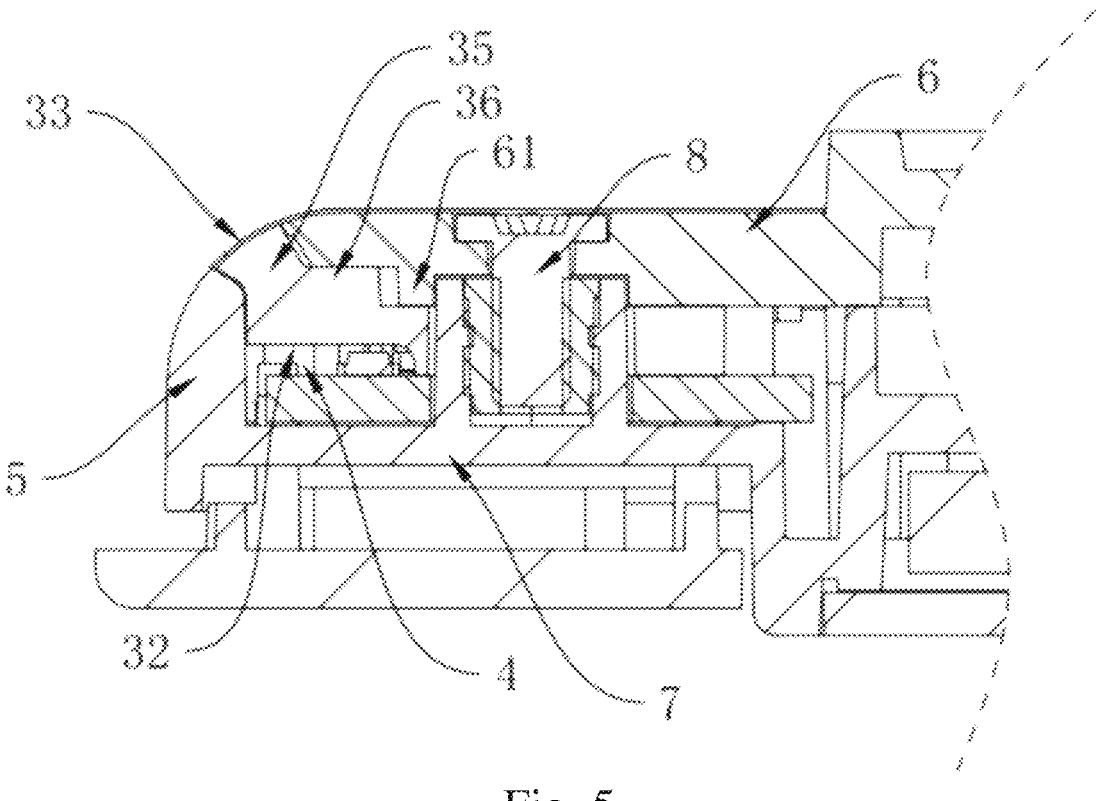
FIG. 5 is a schematically partially sectional structural diagram of a wall-mounted central control screen with a backlight structure according to an embodiment of the present disclosure.

Referring to FIGS. 3-5, the special-shaped light guide strip 3 includes a light incident surface 32 and a light emergent surface 33. Bordering the light source space 4, the surface of the special-shaped light guide strip 3 facing the lamp plate 2 is the light incident surface 32, and the light emergent surface 33 is located on the edge surface of the wall-mounted central control screen. Preferably, for the sake of aesthetics, the light emergent surface 33 is tangential to the edge surface of the wall-mounted central control screen.

In an embodiment of the present disclosure, the plurality of light-emitting lamp beads 1 is RGB-mode LED lamp beads to achieve the effect of emitting colorful light, and the light emergent uniformity may be achieved by adjusting the distance between the LED lamp beads; and the plurality of light-emitting lamp beads 1 may also be replaced with a colorful strip lamp.

In an embodiment of the present disclosure, the special-shaped light guide strip 3 is a rigid light guide strip, which has low cost and better light-emitting properties. Accordingly, the light-emergent uniformity may also be achieved by virtue of the haze and transmittance of the material of the special-shaped light guide strip 3.

In an embodiment of the present disclosure, the light emergent surface 33 is provided as a frosted matte surface, such that the light emergent from the light emergent surface 33 is diffused to a wall to enhance the atmosphere.

Light emitted by the light-emitting lamp beads 1 enters the special-shaped light guide strip 3 via the light incident surface 32, is then refracted and reflected therein and finally emergent from the light emergent surface 33, and is then diffused to a wall, thereby achieving the effect of enhancing the atmosphere.

Referring to FIG. 5, in an embodiment of the present disclosure, the side border 5 is connected with a base plate 7 parallel to the back cover 6, and the back cover 6, the special-shaped light guide strip 3, the lamp plate 2 and the base plate 7 are arranged from the top down. The base plate 7 and the back cover 6 are connected via a screw 8, which may also pass through the special-shaped light guide strip 3 and the lamp plate 2 at the same time; and after the screw 8 is tightened up, the special-shaped light guide strip 3 and the lamp plate 2 are tightly butted against each other, such that the special-shaped light guide strip 3 and the lamp plate 2 can be fixed inside the wall-mounted central control screen to achieve a better fixing effect. The luminous effect can be prevented from being affected due to the sudden shakes of the light-emitting lamp beads 3 when in use.

Referring to FIGS. 3-5, in an embodiment of the present disclosure, the special-shaped light guide strip 3 includes a platy fixing portion 34, a light-emergent extending portion 35 and a stepped connecting portion 36. Here, the platy fixing portion 34 is sandwiched between the back cover 6 and the lamp plate 2; the stepped connecting portion 36 is connected between the light-emergent extending portion 35 and the platy fixing portion 34 The inner surface of the back cover 6 is provided with a plate pressing rib 61, and when the back cover 6 is tightly butted against the stepped connecting portion 36, the plate pressing rib 61 can be tightly butted against the platy fixing portion 34 A light emergent gap is disposed between the side border 5 and the back cover 6, the light-emergent extending portion 35 passes through the light emergent gap after the platy fixing portion 34 is sandwiched by the back cover 6 and the lamp plate 2, and the light emergent surface 33 is tangential to the back cover 6 and the outer side surface of the side border 5, respectively.

In summary, the wall-mounted central control screen of the present disclosure is provided with the backlight structure on its side surface; in the backlight structure, the lamp plate is provided with a plurality of light-emitting lamp beads 1 emitting light that enters the special-shaped light guide strip 3 via the light incident surface 32 disposed on the special-shaped light guide strip 3 and is then refracted and scattered to the light emergent surface 33 The light-emitting lamp beads 1 in the form of RGB-mode LED lamp beads can emit colorful light; and the light emergent uniformity of the light emergent surface 33 can be achieved by virtue of the haze and transmittance of the material of the special-shaped light guide strip 3 and the distance between the LED lamp beads. Further, the light emergent surface 33 is designed as a frosted matte surface, through which the light emergent can be diffused to the wall, such that the backlight effect can be achieved for the wall-mounted central control screen to enhance the atmosphere.

It should be understood that various forms of processes shown above can be used, and the steps can be reordered, added or removed. For example, the steps described in the present disclosure can be executed in parallel, sequentially, or in different sequences, which is not limited herein as long as the desired result of the technical solution disclosed in the present disclosure can be achieved.

In addition, the terms "first" and "second" are only for a descriptive purpose, and should not be construed as indicating or implying relative importance or implicitly indicating the number of a mentioned technical feature. Accordingly, a feature defined by "first" or "second" can explicitly or implicitly include at least one of the features. Unless otherwise expressly specified, any term involving directionality, such as "first direction" and "second direction", refers to a linear direction. In the description of the present disclosure, unless otherwise clearly specified, "a plurality of" means two or more.

The above description provides only the specific embodiments of the present disclosure, and the scope of the present disclosure is not limited thereto. Any changes or substitutions easily conceivable by any person skilled in the art within the technical scope disclosed by the present disclosure should be included within the scope of the present disclosure. Therefore, the scope of the present disclosure should be subjected to the scope of the claims.

What is claimed is:

1. A wall-mounted central control screen, comprising:
light-emitting lamp beads;
a lamp plate; and
a special-shaped light guide strip, wherein the special-shaped light guide strip is provided with a straight groove in an extending direction thereof, a surface of the special-shaped light guide strip provided with the straight groove is abutted against the lamp plate to subsequently form a light source space for accommodating the light-emitting lamp beads, the special-shaped light guide strip comprises a light incident surface and a light emergent surface, the light incident surface borders the light source space, light emitted from the light-emitting lamp beads is towards the light incident surface, and the light emergent surface is located on an edge surface of the wall-mounted central control screen; wherein the wall-mounted central control screen further comprises a side border and a back cover, and the side border together with the lamp plate and the special-shaped light guide strip defines the light source space.

2. The wall-mounted central control screen according to claim 1, wherein the special-shaped light guide strip comprises a platy fixing portion sandwiched between the back cover and the lamp plate.

3. The wall-mounted central control screen according to claim 2, wherein a light emergent gap is disposed between the side border and the back cover, the special-shaped light guide strip comprises a light-emergent extending portion, the light emergent surface is disposed on an outer surface of the light-emergent extending portion, and after the platy fixing portion is sandwiched by the back cover and the light plate, the light-emergent extending portion passes through the light emergent gap.

4. The wall-mounted central control screen according to claim 3, wherein the special-shaped light guide strip further comprises a stepped connecting portion connected between the light-emergent extending portion and the platy fixing portion, the back cover is provided with a plate pressing rib and is tightly butted against the stepped connecting portion, and the plate pressing rib is tightly butted against the platy fixing portion.

5. The wall-mounted central control screen according to claim 2, wherein the side border is connected onto a base plate connected to the back cover via a screw.

6. The wall-mounted central control screen according to claim 5, wherein the screw also passes through the platy fixing portion and the lamp plate, and after the screw is tightened up, the platy fixing portion and the lamp plate are tightly butted against each other.

7. The wall-mounted central control screen according to claim 1, wherein a plurality of the light-emitting lamp beads is disposed evenly inside the light source space.

8. The wall-mounted central control screen according to claim 1, wherein the light emergent surface is provided as a frosted matte surface.

9. The wall-mounted central control screen according to claim 1, wherein the special-shaped light guide strip is a rigid light guide strip.

* * * * *